Sept. 16, 1952     C. FIELD ET AL     2,610,477
ART OF CONGELATION AND APPARATUS
FOR USE IN CONNECTION THEREWITH
Filed Aug. 15, 1940     3 Sheets-Sheet 3
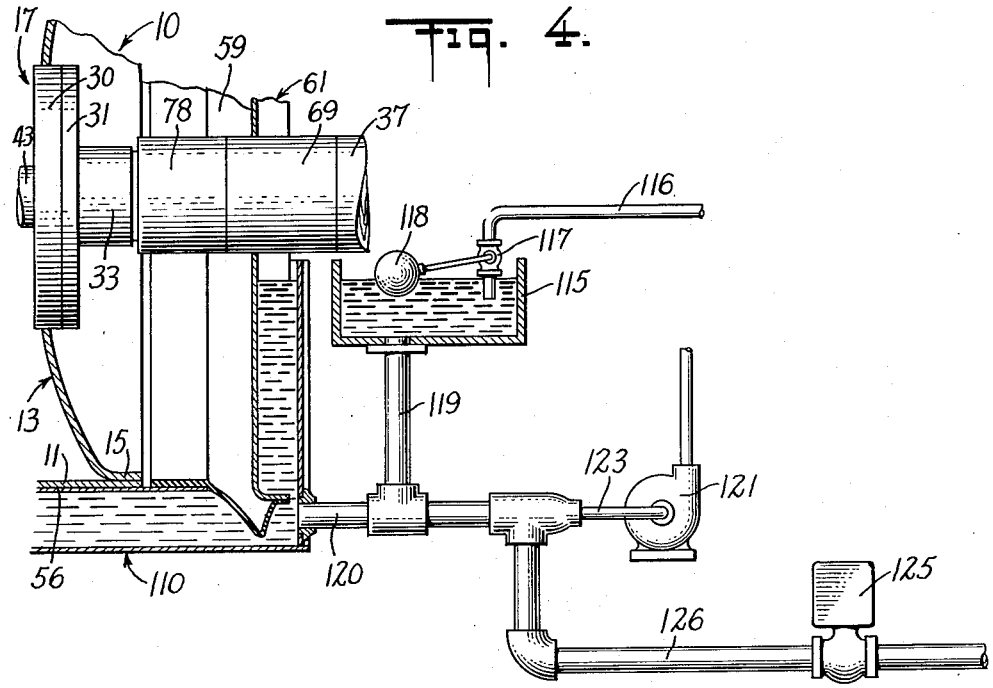
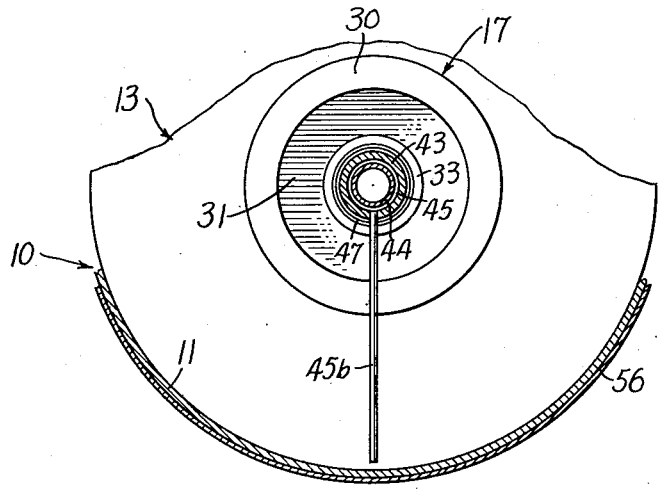
INVENTORS
Crosby Field
BY E. Cornell Stover
Blair, Curtis & Hayward
ATTORNEYS Patented Sept. 16, 1952

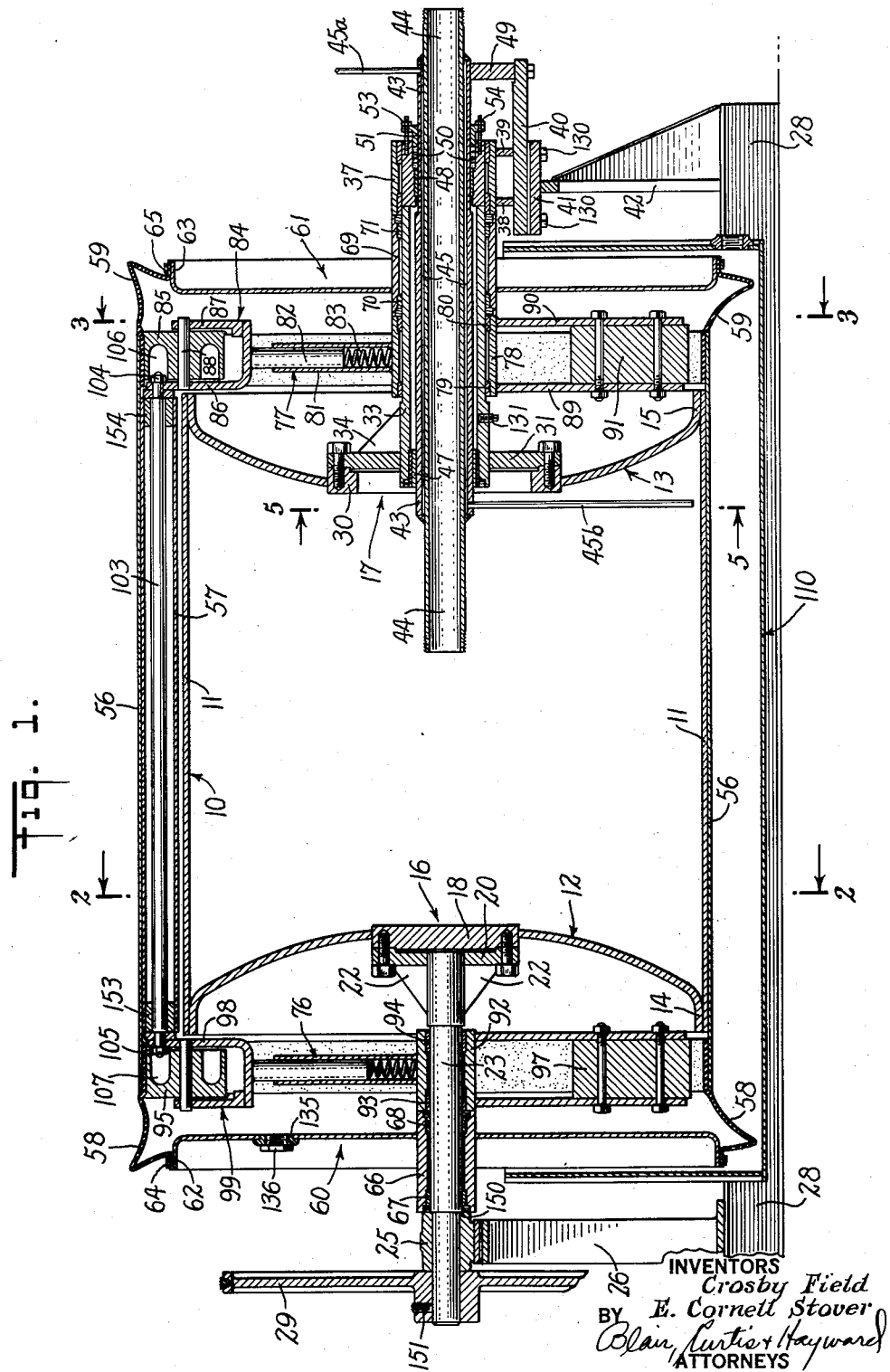

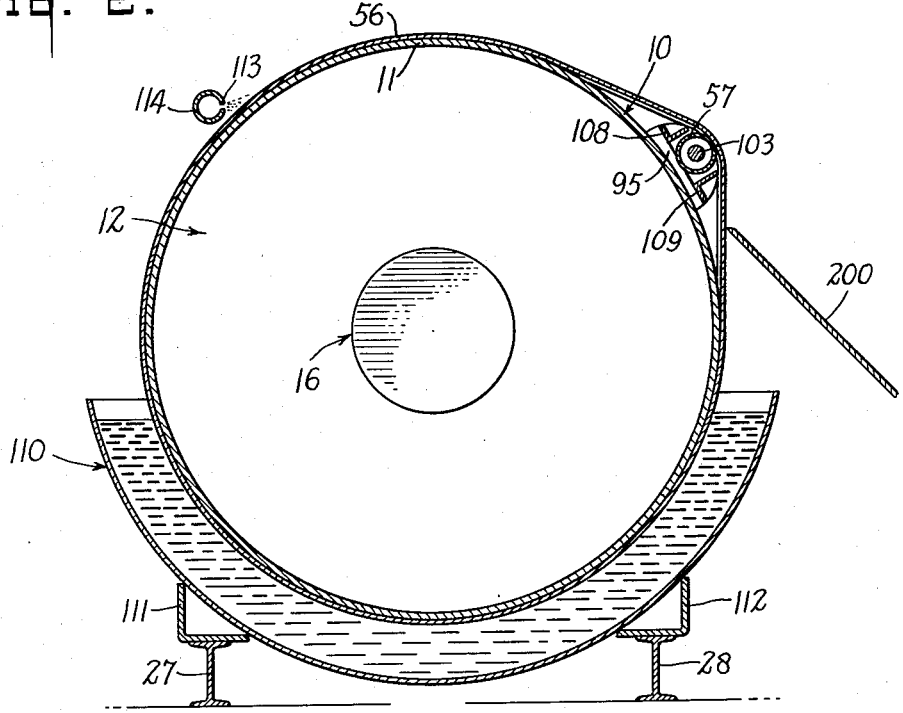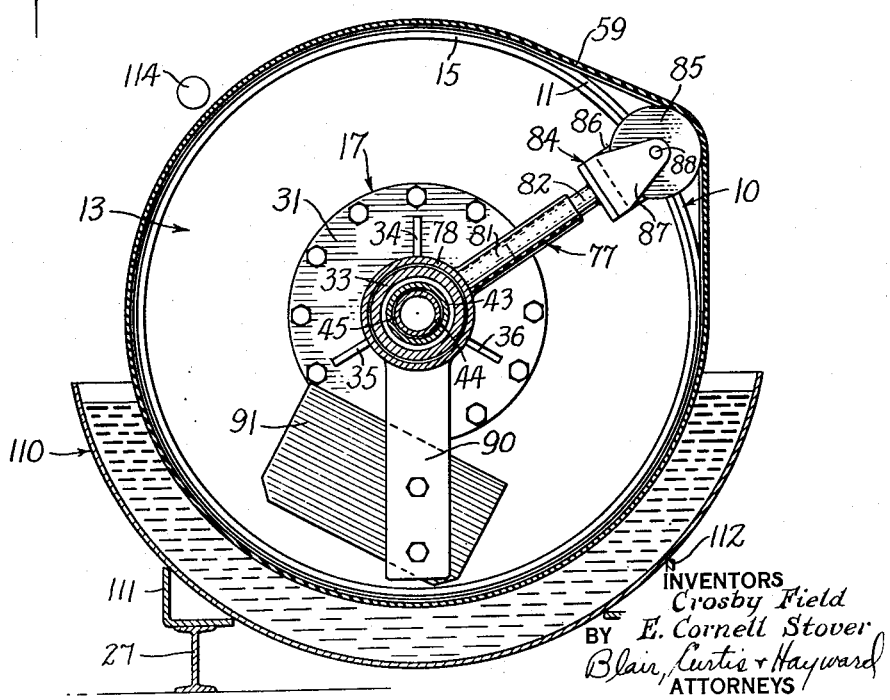

2,610,477

UNITED STATES PATENT OFFICE 2,610,477

ART OF CONGELATION AND APPARATUS FOR USE IN CONNECTION THEREWITH

Crosby Field and Egbert Cornell Stover, Brooklyn, N. Y., assignors to Flakice Corporation, Brooklyn, N. Y., a corporation of Delaware Application August 15, 1940, Serial No. 352,710

10 Claims. (Cl. 62—106)

1

This invention relates to the art of congelation and to apparatus for use in connection therewith for freezing liquids or solids, for making ice, or, in general, for congealing a material to convert it from a liquid or vapor state into a solid state.

One of the objects of this invention is to provide improved freezing apparatus that is practical and efficient in operation. Other objects will be in part obvious and in part pointed out hereinafter.

The invention, accordingly, consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which is shown an embodiment of the present invention, Figure 1 is a staggered vertical axial section of the freezing apparatus;

Figure 2 is a vertical section taken on line 2—2 of Figure 1;

Figure 3 is a vertical section taken on the line 3—3 of Figure 1;

Figure 4 is a diagrammatical showing of apparatus for supplying liquid to be frozen on the freezing surface of the machine; and Figure 5 is a vertical section taken on the line 5—5 of Figure 1.

Similar reference characters refer to similar parts throughout several views of the drawing.

The present apparatus comprises in general a rotating evaporator drum refrigerated on the inside by the usual gas-liquid refrigerant, the drum proper serving as the evaporator for the refrigerating system. Encompassing the drum is an endless flexible metal belt having a diameter larger than that of the drum. The belt is held in contact with the drum throughout the greater portion of its surface by resiliently urged deflecting rollers positioned between the belt and the drum. The belt is thus maintained over a greater part of its area in a heat transferring relationship with respect to the drum, and liquid to be frozen is supplied to the belt on which the liquid freezes.

The evaporator drum is continuously rotating and through friction causes the belt to travel about the axis of the drum. As the belt is thus rotated, it passes over the deflecting rollers which progressively displace successive portions of the belt from the drum and simultaneously flex the belt to a smaller diameter to cause liquid frozen thereon to peel from the belt along the line of

2 the deflection. The heat transferring relationship between the belt and the drum is improved by maintaining a liquid film between the belt and the drum.

Referring now to Figure 1, the refrigerated evaporator drum, generally indicated at 10, is rotatably mounted. It includes a cylinder 11 having its ends closed by a pair of dish shaped heads, generally indicated at 12 and 13. These heads are welded by their flanges 14 and 15 in the open ends of the cylinder 11 with their convex faces facing each other and have a pair of hubs, generally indicated at 16 and 17, welded to their centers.

Hub 16 comprises a flat circular disc 18 which is welded to head 12 in the center thereof. Secured to this disc by a series of bolts is a second disc 20 to which the inner end of a shaft 23 is welded. The connection of shaft 23 to disc 20 is strengthened by a series of webs 22 secured to its sides and to disc 20. Shaft 23 is journaled in a bearing 25 mounted on the upper end of a pair of braces, one of which is shown at 26 (Figure 1), which are secured to foundation beams 27 and 28 (Figure 2). The evaporator is driven through shaft 23 by means of a pulley 29 which is connected to its outer end and is driven by any suitable source of power.

Hub 17 includes an annular ring 30 welded to the evaporator and a disc 31. A hollow shaft 33 extends through and is welded to disc 31 by a liquid-tight joint which is strengthened by three web plates 34, 35, and 36 (Figures 1 and 3) extending between and welded to disc 31 and shaft 33. Shaft 33 is journaled in a bearing 37 secured by a pair of supports 38 and 39 to a plate 40. Plate 40 is supported by a second plate 41 and connected thereto by bolts 130 and plate 41 is supported with respect to the foundation beams 27 and 28 by supporting member 42. Thus, the drive shaft 23 and the shaft 33 rotatably support the evaporator 10.

An exhaust pipe 44, concentric with and extending through shaft 33, is supported with respect thereto by means of a bearing sleeve 43. This sleeve has a greater inner diameter than the outer diameter of pipe 44 and is welded at its ends to pipe 44 by liquid-tight joints. Thus, a passageway 45 is provided between sleeve 43 and pipe 44. The sleeve is rotatably mounted with respect to the shaft 33 by inner and outer bearing assemblies 47 and 48 respectively. These bearing assemblies are lubricated by a suitable low temperature lubricant provided in the annular space between the shaft 33 and the sleeve 43.

This lubricant may be inserted into this space through a hole provided in the shaft 33 and plugged by means of a stud bolt 131. The bearing assembly is sealed against the high pressure in the evaporator by means of packing glands 50 which are tightened by means of an annular gland tightener 51 which is tightened by means of nut and bolt assemblies 53 and 54 inserted into the ends of shaft 33. The construction just described thus provides for relative movement between the exhaust line 44 and the shaft 33 and also seals the interior of the drum from the atmosphere. Sleeve 43 and pipe 44 are prevented from rotating with shaft 33 by an arm 49 which extends from supporting plate 40. Thus, when shaft 33 rotates, any turning movement that it imparts to the pipe 44 is resisted.

Passageway 45 is connected to the high side of the compressor by a pipe 45a, and a pipe 45b leads downwardly therefrom into evaporator 10. Thus, the refrigerant is supplied to the evaporator through pipe 45a, passageway 45, and pipe 45b, and exhausted through pipe 44.

Axial movement of the evaporator drum to the left, as viewed in Figure 1, is prevented by a flange 150 formed by reducing the size of shaft 23 as it passes through bearing 25. This flange abuts against the side of the bearing, thus preventing axial movement in this direction. Axial movement to the right is prevented by pulley 29 which is secured to shaft 23 by set screw 151. Thus, the construction of the parts of the evaporator just described is made sufficient to withstand the maximum internal pressures to which it may be subjected.

Encompassing the cylindrical surface of evaporator 10 is a flexible metal endless belt 56. This belt is of a larger diameter than the diameter of evaporator 10, and its edges are secured by a pair of rubber aprons 58 and 59 to a pair of circular end bells, generally indicated at 60 and 61, which are of substantially the same diameter as the belt and are rotatably mounted with respect to the shafts thereof. The inner edges of these aprons are secured by a liquid-tight joint to the edges of belt 56 by a method such as disclosed in my Patent No. 2,078,938 and their outer edges are secured by binding rings 64 and 65 to annular flanges 62 and 63 formed on end bells 60 and 61 respectively.

To rotatably mount end bell 60 with respect to shaft 23, end bell 60 is supported on shaft 23 by a sleeve 66 to which it is welded, and the sleeve 66 is rotatably mounted with respect to shaft 23 by bearing assemblies 67 and 68 suitably packed to provide a fluid tight seal. End bell 61 is rotatably mounted with respect to the shaft 33 by means of a sleeve 69 which is rotatably mounted on shaft 33 by suitable bearing assemblies 70 and 71, also sealed. Thus, end bells 60 and 61 are freely rotatable on shaft 23 and 33, and thus, belt 56 is free to travel about evaporator 10, as will be described.

Referring now to Figures 1 and 3, a pair of deflector roller supports, generally indicated at 76 and 77, are mounted on shafts 23 and 33 respectively in such manner that the rotation of the shafts does not impart rotation to the deflector arms. As the general construction of these supports is substantially the same, specific description will be limited to support 77, which is mounted by a hub 78 and bearings 79 and 80 on shaft 33. This hub has a tubular arm 81 extending radially upwardly therefrom (Figures 1 and 3). A plunger rod 82 (Figure 1) is slidably mounted in this tube and is urged outwardly by a spring 83. Secured to the upper end of the plunger rod 82 is a U-shaped support, generally indicated at 84, which mounts a shaft 88 which mounts a roller 85 between the upper ends of legs 86 and 87. This roller is resiliently urged radially against the periphery of belt 56 by means of the spring 83. The inner edge of each apron 58 and 59 is provided with a thickened portion where the apron joins the metal belt and this thickened portion serves as a resilient track on which the rollers travel as the belt travels past the rollers 85.

To maintain the roller in the desired radial position about the axis of the drum, the roller is counterweighted to utilize the force of gravity to maintain such position. To this end there are welded to hub 78, a pair of arms 89 and 90 which are spaced from each other and which carry a counterweight 91 secured thereto in any suitable manner, as by bolts.

As pointed out hereinabove, deflector roller support 76 is of substantially the same structure as support 77, which is rotatably mounted with respect to shaft 23 by means of its hub 92 and bearing assemblies 93 and 94. It is counterbalanced by counterweight 97, and has a roller 95 rotatably mounted on a U-shaped support, generally indicated at 99. Thus, its roller 95 exerts a resilient pressure against the other edge of belt 56 and holds a major portion of the belt in contact with the evaporator.

To provide for aligned action of the main deflection rollers 85 and 95 so that the metal belt is not subjected to twisting action, the roller supporting members 84 and 99 are rigidly secured together by cross bars 108 and 109 (Figure 2) extending across but spaced from the surface of drum 11. These bars are secured to the opposing faces 98 and 86 (Figure 1) of the deflecting roller supports and are themselves spaced to receive between them a secondary roller 57 extending lengthwise of the cylinder 11 and at its end rotatably supported by bearings 153 and 154 on a rod 103 extending between the legs 86 and 98 and secured thereto by nuts 104 and 105. Clearance between these nuts 104 and 105 and the deflecting rollers is provided by annular grooves 106 and 107 in the rollers 85 and 95 respectively. The secondary roller 57 has a much smaller diameter than that of the main deflecting rollers 85 and 95 and serves to prevent any buckling or sagging of the belt as it is deflected by the rollers 85 and 95. The spacing of the axis of the secondary roller 57 with respect to the axes of the deflecting rollers 85 and 95 is such that the three rollers acting together tend to keep the surface of the metal belt along the line of deflection in a straight line.

In operation the drum 11 is continuously rotating through the medium of the shaft 23 and this rotating movement is transmitted to the belt 56 by the friction maintained between the belt and the drum so that the belt is caused to travel at the same surface speed that the drum has. As the successive portions of the belt traveling past the deflecting rollers come under the influence of the deflecting rollers the portions are lifted from the drum and are deflected to the diameter of the deflecting rollers which diameter is smaller than that of the drum 10. As the portions pass the deflecting rollers they then go back into contact with the drum. The deflecting rollers, in order to accomplish this deflecting action, must resist the tendency of the belt to cause them to revolve about the axis of the drum and this resistance is provided by means of the counterweights 91 and 97 which provide a force action on the supports of the deflecting rollers acting against the travel of the belt. Thus, these counterweights serve also to maintain the radial position of the deflecting rollers at a substantially constant position.

Because both the drum 10 and the belt 56 rotate at the same surface speed a relative movement between the two is caused by the fact that the periphery of the belt 56 is greater than that of the drum 10. Thus, a complete revolution of the drum 10 does not cause a complete revolution of the belt 56 and the belt 56 therefore effectively travels backwards over the surface of the drum 11. This relative movement of course is also imparted to the end bells 61 and 60 but does not cause binding because relative movement is permitted between the end bells and the shafts 23 and 33.

With the construction thus far described, the flexible belt 56, its end bells 60 and 61, and their sealed bearing connection with the shafts 23 and 33 provide a complete closure for the evaporator drum 10, so that no moisture from the atmosphere can enter the space between the belt and drum and so that no moisture can reach and congeal on the surface of the drum to interfere with the heat transferring relationship between the drum and the belt. Further, a closure prevents excess water, supplied to the belt and not frozen, from congealing on the evaporator surface or on the inside of the belt and makes it possible to partially submerge the belt and drum in a tank of liquid to be frozen, as shown in Figure 2, when the liquid to be frozen is supplied to the belt through the medium of a liquid body.

Furthermore, provision of this sealed closure around the evaporator drum makes it possible to improve the heat transferring relationship between the evaporator drum and the flexible belt by providing a liquid film between the evaporator drum and the portions of the belt drawn tight thereagainst. To this end, the space between the belt, end bells, and evaporator drum is filled through a hole 135 closed by plug 136 in the end bell 60, half full with a liquid that does not congeal at the operating temperatures used. A satisfactory liquid is propylene glycol. As the drum 10 rotates, propylene glycol works in and forms a liquid film between the belt and the drum filling all interstices therebetween and excluding all gas or air pockets. Such a liquid film provides a better heat transferring medium than does gas and improves the heat transferring efficiency. This liquid also serves to lubricate the bearings 92 and 78 supporting the deflecting mechanism and also lubricates the other moving parts of the deflecting mechanism.

As best shown in Figure 2, the lower portion of the evaporator 10 and thus belt 56 is submerged in a tank, generally indicated at 110. This tank is of semi-cylindrical shape and is supported by angle braces 111 and 112 which are secured to the top of beams 27 and 28. This tank is filled with the liquid which it is desired to freeze onto belt 56 and as the belt is in contact with the evaporator when it passes through the liquid, the liquid freezes onto the belt. This liquid is also supplied to the surface of the belt through a row of nozzles, one of which is shown at 113, in a pipe 114 which is parallel to the surface of the belt. As the evaporator in Figure 2 rotates in a clockwise direction the liquid from these nozzles is directed upwardly over the face of the belt and thus, as it runs down, it freezes thereon as the belt at this point is in intimate contact with the surface of the evaporator. Thus, liquid to be frozen on the belt is supplied both by tank 110 and by conduit 114.

To insure the maintenance of a constant level of liquid in tank 110 and to supply the liquid to conduit 114, the apparatus shown in Figure 4 may be used. This comprises an auxiliary tank 115 into which the make-up liquid is supplied through pipe 116. A liquid level is maintained in this tank by means of valve 117 operated by float 118. As tank 115 is connected to tank 110 through pipes 119 and 120, the level maintained in tank 115 is also maintained in tank 110. Pump 121 which draws liquid from pipe 120 through pipe 123 supplies liquid to the nozzles in pipe 114 (Figure 2). The excess liquid supplied through nozzles 113 drains down into tank 110. A solenoid controlled valve 125 is provided in exhaust pipe 126 connected to pipe 120, to automatically empty the tank 110 when the machine stops.

When the liquid to be frozen is supplied to the belt through the medium of the tank and the spray nozzles, the temperature of the evaporator and the speed of the drum may be regulated to provide for the formation of the desired thickness of ice on the surface of the belt; and as this ice reaches the point where it is deflected to the smaller diameter of the deflecting rollers, the ice peels from the machine and passes down a chute 200 to a suitable storage compartment or to such other apparatus as might be desired. Further, by regulating the speed of rotation, and the temperature of the evaporator, and the application of the liquid to be frozen through the spray nozzle 13, the ice peeled off may be dry and sub-cooled.

The low temperatures available by means of the evaporator and the efficient heat transfer provided by the liquid film make it possible to maintain the exterior surface of the belt at a relatively low temperature, close to that of the evaporator temperature, so that when desired, very rapid freezing on the surface of the belt may be obtained, which makes the apparatus desirable for freezing foodstuffs where quick freezing is necessary to avoid damage of the foodstuffs.

Thus, an efficient and practical refrigerating apparatus has been disclosed in which the above objects, as well as many others, are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

We claim:

1. In refrigerating apparatus, in combination, a cylindrical evaporator, a flexible endless belt encompassing the cylindrical surface of said evaporator, said evaporator and said belt being rotatably mounted, deflector means positioned between said belt and said evaporator, counterweight means operatively associated with said deflector means to hold said deflector means in substantially a stationary position with respect to said belt and said evaporator, and means for rotating said evaporator.

2. In refrigerating apparatus, in combination, a cylindrical evaporator, a flexible endless belt encompassing the cylindrical surface of said evaporator, said evaporator and said belt being rotatably mounted, deflector means positioned between said belt and said evaporator, counterweight means operatively associated with said deflector means to hold said deflector means in substantially a stationary position with respect to said belt and said evaporator, means for rotating said evaporator, and a liquid film positioned between said belt and said evaporator acting as a heat transferring medium therebetween and having a freezing point lower than the operating temperature of said evaporator.

3. In refrigerating apparatus, in combination, a cylindrical evaporator, an endless flexible belt encompassing and contacting said evaporator, deflector means positioned between said belt and said evaporator, said deflector means resiliently holding the portion of said belt not deflected from the surface of said evaporator in contact with said evaporator, means rotatably mounting said evaporator, means for driving said evaporator, said evaporator driving said belt through its frictional engagement therewith, and counterweights operatively associated with said deflector means to maintain said deflector means in substantially a stationary position with respect to said belt and said evaporator.

4. In refrigerating apparatus, in combination, a cylindrical evaporator, an endless flexible belt encompassing and contacting said evaporator, deflector means positioned between said belt and said evaporator for resiliently holding the portion of said belt not deflected from the surface of said evaporator in contact with said evaporator, means rotatably mounting said evaporator, means for driving said evaporator, said evaporator driving said belt through its frictional engagement therewith, counterweights operatively associated with said deflector means to maintain said deflector means in substantially a stationary position with respect to said belt and said evaporator, and a liquid film positioned between said evaporator and said belt, said liquid film acting as a heat transferring medium between said belt and said evaporator and having a freezing point below that at which said evaporator operates.

5. In refrigerating apparatus, in combination, a cylindrical evaporator, a pair of shafts rotatably mounting said cylindrical evaporator, an endless flexible belt encompassing and contacting the cylindrical surface of said evaporator, a pair of deflector supporting arms rotatably mounted on said shafts, means for driving said evaporator through one of the shafts connected thereto, said evaporator driving said belt through frictional engagement therewith, deflector means mounted on said deflector supporting arms and positioned between said belt and said evaporator, and a pair of counterweights operatively associated with said deflector supporting arms for holding said deflector means substantially stationary when said evaporator and said belt are rotatably driven.

6. In refrigerating apparatus, in combination, a cylindrical evaporator, an impervious flexible endless belt encompassing and contacting the cylindrical surface of said evaporator, deflector means positioned between said belt and said evaporator, counterweight means operatively associated with said deflector means to hold said deflector means in substantially a stationary position with respect to said belt and said evaporator, means including said flexible belt for enclosing said evaporator, counterweight, and deflector means, and means for causing said belt to travel about said evaporator and deflector means.

7. In refrigerating apparatus, in combination, a cylindrical evaporator, a pair of shafts, an endless flexible belt encompassing and contacting the cylindrical surface of said evaporator, a pair of deflector supporting arms mounted at opposite ends of said evaporator and rotatably mounted on said shafts, deflector means mounted on said deflector supporting arms and positioned between said belt and said evaporator, a pair of end bells rotatably mounted on said shafts, means connecting the peripheries of said end bells to the edges of said belt, means for causing said belt to travel about said evaporator and deflector means, and a pair of counterweights operatively associated with said deflector supporting arms for holding said deflector means in substantially a stationary position.

8. In a heat transfer device: a heat transfer drum: an endless imperforate belt, said belt being longer than the circumference of said drum, and being placed around and in contact with said drum; means for tensioning said belt around said drum, and having belt-supporting areas extending across and supporting said belt from one side edge to the other side edge; means for rotating said drum and driving said belt; end means closing the end openings of said belt for forming therewith a closed chamber; and a liquid in said chamber and in contact with said belt and drum, which liquid will remain liquid at the operating temperature in the device.

9. In a refrigeration device: a rotatable heat transfer drum; an endless imperforate belt, said belt being longer than the circumference of said drum, being placed around and in contact with said drum, and being movable with said drum; end means closing the end openings of said belt; and means for refrigerating said drum by evaporation therein of a refrigerant; said belt being wider than said drum and including an overhanging marginal portion extending beyond each end of said drum, each end means embodying an endless rubber-like apron portion overlapping the inner surface of the adjacent overhanging belt portion, and the outer surface of each apron portion being sealed in extensive face-to-face contact with the inner surface of each adjacent overhanging belt portion, whereby the exposed line of juncture between the overlapped belt and apron portions is separated from the heat-transferring portions of said drum by the width of said overhanging belt portion.

10. In a heat transfer device: a heat transfer drum; supporting trunnions for said drum; means for supplying to and removing from said drum through one of said trunnions a heat exchange medium; an endless imperforate belt, said belt being longer than the circumference of said drum, and being placed around and in contact with said drum; end plates mounted on said trunnions and opposed to the ends of said drum; a stretchable medium secured between and to the edges of said end plates and belt; said trunnion, stretchable medium, and end plates closing the end openings of said belt for forming with said belt a closed chamber; a tensioning structure placed inside of said chamber, and outside of and parallel to said drum; means supporting said structure on said trunnions and in contact with said belt for tensioning said belt, said structure having a belt-supporting surface extending effectively across and supporting the entire width of the belt from one side edge to the other; and means for rotating said drum by rotating one of said trunnions.

CROSBY FIELD.
E. CORNELL STOVER.

REFERENCES CITED

The following references are of record in the file of this patent:

UNITED STATES PATENTS

| Number | Name | Date |
|---|---|---|
| 1,528,043 | Bennett | Mar. 3, 1925 |
| 1,803,212 | Schroeder | Apr. 28, 1931 |
| 2,005,733 | Field | June 25, 1935 |
| 2,005,734 | Field | June 25, 1935 |

FOREIGN PATENTS

| Number | Country | Date |
|---|---|---|
| 603,859 | Germany | Oct. 9, 1934 |